United States Patent [19]

Perkins

[11] 4,406,398

[45] * Sep. 27, 1983

[54] FLUID TEMPERATURE BLENDING CONTROL

[76] Inventor: Jean K. Perkins, P.O. Box 111869, Anchorage, Ak. 99511

[*] Notice: The portion of the term of this patent subsequent to Dec. 30, 1997 has been disclaimed.

[21] Appl. No.: 333,281

[22] Filed: Dec. 21, 1981

[51] Int. Cl.³ .................. G05D 23/00; G05D 11/00
[52] U.S. Cl. .................... 236/12.15; 236/94; 137/551
[58] Field of Search .............. 236/12, 94; 137/551, 137/552, 553, 554; 165/11; 374/147, 148; 340/584, 595, 599

[56] References Cited

U.S. PATENT DOCUMENTS

| | | | |
|---|---|---|---|
| 1,636,698 | 7/1927 | Leonard et al. | 236/94 X |
| 1,941,920 | 1/1934 | Wilhjelm | 236/94 |
| 2,696,604 | 12/1954 | Markow et al. | 340/595 |
| 2,800,283 | 7/1957 | Weber et al. | 236/94 |
| 3,960,016 | 6/1976 | Symmons | 236/94 X |
| 4,241,868 | 12/1980 | Perkins | 236/94 X |

Primary Examiner—Albert J. Makay
Assistant Examiner—Harry Tanner
Attorney, Agent, or Firm—Sanford Astor

[57] ABSTRACT

The described invention embodies a plumbing fixture device for the determination and display of exacting control adjustments necessary to achieve a predetermined fluid temperature blend. The device of the invention employs an apparatus constructed of a set of manually operated fluid control valves with an enclosing valve body, and a temperature mixing indicator consisting of an electronic signal indicating means to translate and communicate sensed fluid discharge temperature into display indications depicting the need for a specific corrective control action by the operator. The electronic signal indicating means is an integral part of the fixture which for reasons of reliability is electrically activated by a fluid flow switch mechanically linked to the fluid control valve handles and provides a positive sequence of display indications that culminate in a quiescent state when the desired temperature range has been obtained.

12 Claims, 4 Drawing Figures

FLUID TEMPERATURE BLENDING CONTROL

BACKGROUND OF THE INVENTION

The purpose of the invention relates to a new fluid temperature blending control system which assists in attainment of a desired fluid discharge temperature by means of an improved fluid temperature mixing indicator and an apparatus of fluid control valves. The invention further implies relevant advancements in blending control though lower manufacturing costs, a reduced number of components, greater ease of operation, and a higher reliability during use. More particularly the invention incorporates efficient developments in the means of activating the indicator system, method and presentation of fluid control valve handle adjustment directions, and in manual selection of fluid temperature ranges for which achievement or need for further control valve handle manipulation is communicated to the operator.

Much exists of prior art in fluid temperature mixing indicators, these devices are well known in both industrial and domestic applications for providing consistent temperature blending of a plurality of fluids that are emitted from common devices such as; lavatory faucets, bath and shower installations, and photographic development processing equipment. The majority of said devices consists of simple mechanical elements which produce indicating results by display of analog readings from mercury of bi-metalic sensors. U.S. Pat. Nos. 2,171,992 and 3,960,016 are typical of these early devices and are representative of a general means of mechanical sensor detection and display indication. Such mechanical devices have been notably unsatisfactory because they contain indicator scales which are often difficult to interpert, respond slowly to changes in the fluid media temperature, and are not easily calibrated. Although these mechanical types of mixing indicators have been marketed for sometime their popularity with the public has received limited acceptance for they continue to be utilized for lack of low cost commercially available alternatives.

Modern temperature indicators and automatic control mixing valves exampled in U.S. Pat. Nos. 3,721,386 and 3,927,571 have taken advantage of technology improvements of recent years in electronic temperature sensing and control to produce devices in related disciplines which represent a simplified and more responsive indicator means with techniques that are now standard to the art. These devices typically employ two or more signal indicating means which translate and display electrical resistive changes of temperature sensor elements in the fluid discharge path, as exampled in Brick et al, and whose output can be further amplified into electromechanical means to adjust and regulate a fluid blend automatically. Although said patents are representative of a large embodiment of such devices that contain electronic temperature sensing and display, none possess means for communicating precise indications needed for specific control or adjustment, or are activated as a result of fluid flow, or allow for a broad range of application in public use.

My U.S. Pat. No. 4,241,868 discloses an apparatus which overcomes many of the aforementioned difficulties by providing a fluid temperature mixing indicator consisting of; a plumbing fixture device which utilizes fluid valves having control handles to control and combine a plurality of fluids of different temperatures, an encompassing valve body to include fluid inlets, a mixing chamber with an outlet for emitting a fluid discharge, and an indicating signal means acting as an integral part to display the fluid discharge temperature. The described indicating signal means further provides and communicates need for particular manual control handle adjustment to achieve a predetermined temperature range of the blended fluid discharge. Additionally, the described device offers indicator activation upon fluid flow, automatic emergency shutdown temperature regulation through an in line electromechanical valve means, and electronically translated temperature indications which are readable under varying lighting conditions.

While the method and apparatus described in said prior art application and cited in patents are of considerable value in indication and control of fluid temperature blending, the usefulness of such devices would be greatly increased if they could be easily manufactured, obtain a higher reliability of activation under varying fluid pressure conditions, allow an array of alternative indicating means for persons with vision impairments, and permit selection of responsive temperature thresholds to suit a variety of operators. This prior art has been deficient in providing suitable long-term operation especially with fluids that contain heavy concentrations of alkalis or acids which corrode actuating mechanisms, where heavy parts per million pollution ratios in the discharge render sensor elements ineffective, and when high gas to liquid ratios exist causing erroneous readings.

Among several objects of the prior art form it may be further noted that sequencing of display indicator elements which depict the need for control adjustment or its attainment permitted possible confusion of the operator in that achievement of a desired temperature range was related by all signal display indicators being illuminated or activated. Experience has shown that proper sequencing avoids this problem by allowing all signal display indicator elements to remain in a deactivated condition when the correct fluid discharge temperature blend ratio was obtained thus clearly denoting achievement of the correct temperature range.

SUMMARY OF INVENTION

Accordingly it is a general object of the invention to provide an improved temperature mixing indicator that eliminates inherent difficulties of false readings or loss of display indications as a result of low fluid discharge pressure, fluid temperature sensor element contamination, or high gas to fluid ratios experienced in common lavatory use. Further, it is an intention of the embodiment to encompass useful achievements in display indications which include; a less confusing sequence of indicator annunciation, selective temperature response ranges which may be adjusted by the operator to suit changing control requirements, and a substantial reduction in internal component parts for ease of construction, operation and maintenance.

The invention accomplishes the above objects by provision of the apparatus, in combination, a set of fluid valves having manual control handles to control, adjust, and combine fluids of various temperatures, an encompassing valve body to include a plurality of fluid inlets connected to said fluid valves, a fluid mixing chamber with an outlet for discharging a single blended composite of fluid inlet contents, a signal indicating means to display prompting information to the operator depicting the need to adjust a particular valve control handle, and an integral valve control handle actuation switch to permit positive activation of said signal indicating means. The signal indicating means provides electronic signal converting circuitry to translate sensed fluid discharge temperature into selectively arranged display indications which direct manual fluid control valve handle manipulations necessary to attain a predetermined fluid discharge temperature range. The electronic signal converting circuitry consists of a linear semiconductor temperature sensor or thermistor device, a first and second voltage comparator, a temperature range selective resistor array, signal display indicator elements of multi-colored lights or passive and reflective liquid crystal elements or audio frequency emission elements either singly or in combination, and a simple rotationally activated electrical switch device that allows electrical current to power the signal indicating means when any single control valve handle has been manipulated from the plurality of fluid control valve handles to obtain discharge from the apparatus outspout.

It is further an object of the invention to provide a signal indicating means that renders user selection of display indicator temperature ranges by manipulation of a range potentiometer positioned as to allow for alternate electrical reference bias levels at the input of the signal converting voltage comparators to permit detection of resistive sensor device voltage inputs at different thresholds. This action enables choice of optional fluid temperature ranges and sets a maximum allowable temperature deviation about the center of that range before display indicator elements are again reactivated to communicate the need for additional fluid discharge temperature adjustment back to the desired temperature blend range.

It is yet another object of the present invention to reduce the component count and complexity associated with its most practical implementation for use by the public, in home lavatories. The apparatus of this invention has achieved this in practice by employing technological advancements of semiconductor components arranged in a unique manner as to preclude need for expensive and complicated electronic logic component devices of prior art.

The final objective of the embodiment is to provide a clear, instructive arrangement and sequencing of display indicator elements that portray an exacting manipulative fluid control valve handle adjustment to obtain a desired and predetermined fluid temperature range. This is accomplished by means of indicating the desired manipulation by selectively signaling which fluid control valve handle is to be adjusted until display indications are no longer present, thus, depicting a predetermined temperature range was reached and no further adjustment is required.

BRIEF DESCRIPTIONS OF THE DRAWINGS

The stated objective of the invention and the manner in which it is achieved, as summarized above, can be more readily understood by reference to the following detailed description of the apparatus as shown in the accompanying drawings wherein:

FIG. 1 is a front perspective plan view, partially broken away to reveal the mechanical and electrical components of the apparatus of the present invention.

FIG. 2 details a magnified plan view of the fluid control valve handle, control valve handle stem, fluid release switch, and signal indicating means.

DETAILED DESCRIPTION OF THE INVENTION

Figure 1:
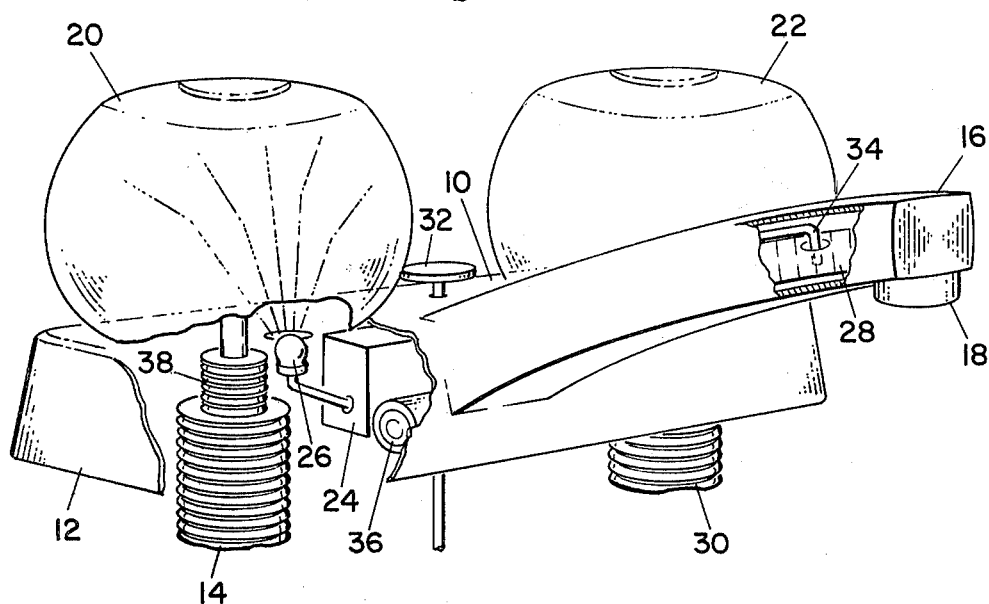

Referring initially to FIG. 1, there is shown, for illustrative purposes, a partially broken away perspective view of the apparatus constructed in accordance with the invention. Drawn is a standard dual lavatory faucet valve body enclosure 10, comprised of a one piece cast base unit 12 attached to a sink portion, fluid inlet means 14 and 30, fluid control valve handles 20 and 22 for manual adjustment of in line fluid control valves 38 and opposite control valve not shown, and a protruding fluid outspout 16 with an exit nozzle 18. Operationally, fluids of different temperatures pass into fluid inlet means 14 and 30 and are coupled to respective fluid control valves 38 and opposite valve not shown and on to mixing chamber 36 where they are blended into a single fluid composite. The fluid composite then exits along fluid outspout 16 by means of fluid pipe 28 whereupon a resistive sensor device 34 electrically samples the fluid composite temperature before the fluid discharges at exit nozzle 18.

An indicating signal means is contained within the valve body enclosure 10 and consists of a component system to include, a resistive sensor device 34, electronic control box 24, and display indicator element 26 and opposite indicator element not shown. Resistive sensor device 34 presents an internal value that is an electrical equivalent of the actual fluid temperature being sampled at fluid pipe 28 and transmits that reading to electronic control box 24 located within the cavity void of the base unit 12 midway between fluid control valve 38 and opposite valve not shown. The electronic control box 24 acts to electronically translate the electrical resistance presented by resistive sensor device 34 and as a resultant determination of that logic services display indicator element 26 and opposite element not shown. Display indicator elements 26 and opposite element not shown are arranged to provide direct visible announcement of need for a specific fluid control valve adjustment to bring about a predetermined fluid temperature blend through activation of an individual element whose location is associated with a fluid control valve handle requiring additional manipulation.

As is common practice with standard lavatory faucets a sink plug handle 32 is also shown to permit adjustment of fluid levels in the catch basin not depicted below the fluid exit nozzle 18.

Figure 2:
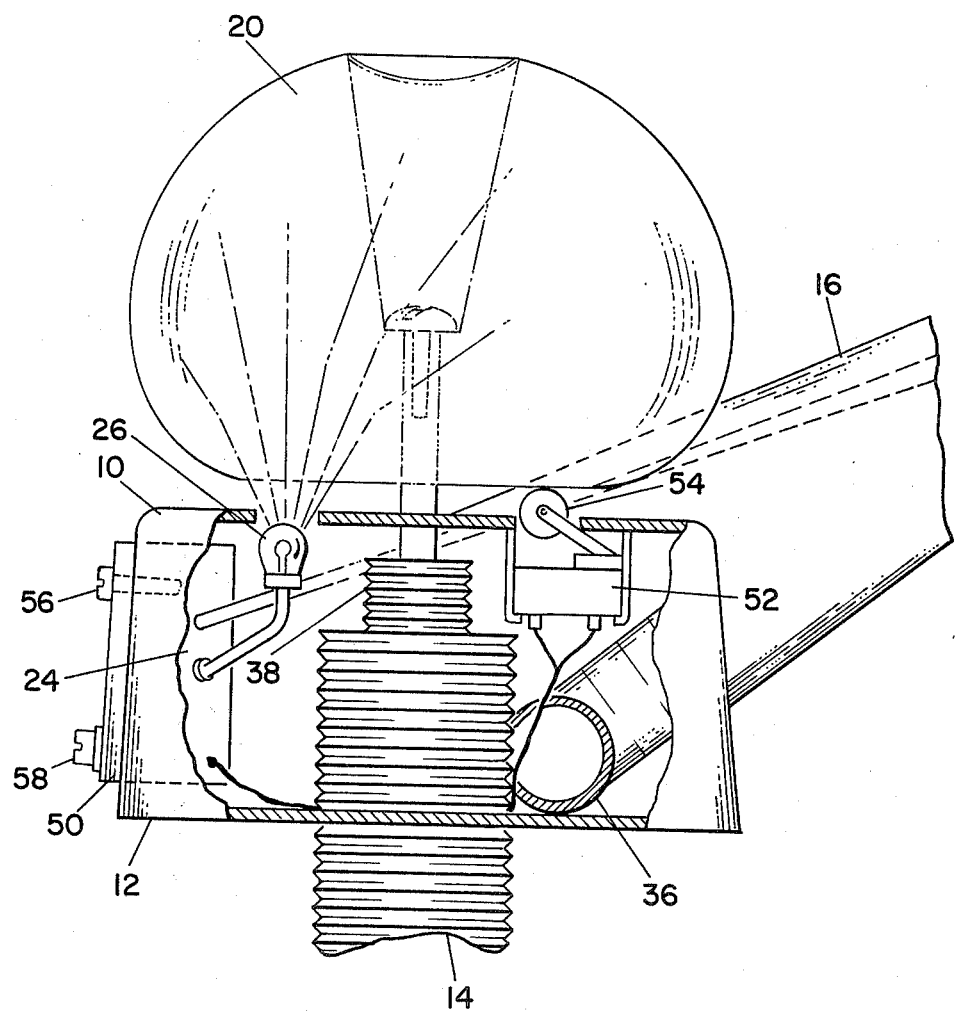

Detail of the internal working parts can be further examined by study of FIG. 2 an enlarged side view partially broken away of the lavatory faucet valve body enclosure 10 of the present invention containing the features of an electronic control box 24 placed to the rear of the base unit 12, a fluid control valve 38, fluid control valve handle 20, fluid release switch 52 with roller lever 54 in position, and a display indicator element 26 so arranged to project radiant illumination on to fluid control valve handle 20. There is also shown fluid inlet means 14 and fluid outspout 16 to orientate the apparatus to the viewer with reference to previous figures.

An affixing method for the electronic control box 24 is provided for by screw 56 which holds the box to the base unit 12 and allows access to the faucet by means of cover plate 50 when maintenance or service is to be performed on the internal components of the invention. Operator adjustment and selection of desired display indicating fluid temperature ranges can be accomplished by manually moving the range adjusting switch 58 which is located to the rear of electronic control box 24 and extends outward from the base unit 12 for ease of manipulation.

From the plurality of fluid control valve handles, the rotation of a single fluid control valve handle 20 from its closed position releases a fluid discharge at fluid outspout 16 causing roller lever 54 from a plurality of roller levers to rise engaging for example fluid release switch 52 which contains internal conductive metallic contacts that in turn permit flow of electrical current to electronic control box 24. The flow of electrical current to electronic control box 24 from any of said parallel fluid release switches allows electronic translation of fluid discharge temperature sampled by resistive sensor device means not shown into either activating display indicator elements not shown or leaving said display indicators extinguished. If the electronic control box 24 detects a need for further manual fluid control valve handle adjustment it will cause display indicator element 26 or other display indicator element not shown to illuminate at respective fluid control valve handles communicating this requirement. Continued rotation of fluid control valve handle 20 to increase or decrease fluid discharge flow rates from the apparatus will have no further effect on parallel fluid release switch 52 which remains engaged until fluid control valve handle 20 is again returned to its fluid control valve closed position causing downward pressure to again be exerted on roller lever 54, disengaging fluid release switch 52 internal electrical contacts and preventing electrical current flow to electronic control box 24 which ceases any further translation of fluid temperature reading into display indicator element actions. Said plurality of fluid control valve handles, roller levers, and parallel fluid release switches all acting in accordance with the described method above constituting the operational means by which any single fluid control valve handle rotation causes a parallel fluid release switch to engage and permits electrical current to flow to electronic control box 24. The parallel nature of the said fluid release switches provides electrical current to electronic control box 24 until all fluid control valve handles have been returned to their closed or no fluid discharge position. The use of a roller type lever saves on wear of the parts and prevents jamming as compared to other types of lever devices that could be utilized.

Now referring to FIG. 1 and FIG. 2 in combination, a typical operation of the device as viewed by an observer would be as follows: the operator upon approaching the apparatus may rotate fluid control valve handle 20 or 22 in a random manner to allow fluid discharge to begin at exit nozzle 18. As either fluid control valve handle is rotated away from its valve closed position respective parallel roller lever 54 in example raises to allow engagement of its fluid release switch 52 internal conductive contacts permitting electrical current to flow to electronic control box 24 initiating electronic translation of the fluid discharge temperature which is in turn presented to the operator as an activated display indicator element 26 or opposite element not shown depending upon which specific fluid control valve handle adjustment is needed to obtain a predetermined fluid temperature range. Adjusting the selected fluid control valve handle until its display indicator element turns off would normally bring about a desired preset temperature range, however, if during this manipulation it was necessary to increase the overall fluid discharge or that an overadjustment occurred, the currently activated display indicator would turn off at the fluid control handle being adjusted and turn on at an opposite control valve handle showing need for additional correction. The operator by adjusting specific fluid control valve handles as directed by display indicator elements may by this method obtain a state where both indicator elements remain off thus revealing that an exact achievement of the desired fluid temperature range had been accomplished. However, again, if the temperature of the fluid discharge should fluctuate beyond the selected temperature range, display indicator elements 26 or opposite element not shown will reactivate to depict the need for additional correction.

It can be clearly understood to the observer that arrangement and color coordination of the display indicator elements described would provide additional benefit in easily identifying an exacting and corrective manipulation necessary to achieve a predetermined temperature range. Simply, placing the display indicator elements within close proximity to the fluid control valve handles so that said element activation is associated with a particular handle either by casting light into or reflecting upon it assists in the operator's selection of a corrective action. Colored light emissions further aid the operator in taking an appropriate action in that display indicator elements can be color coded to fluid control valve handles whose normal fluid temperature may be associated with a particular spectral frequency, such as red illumination for elevated fluid temperatures and blue or green for lower fluid temperatures. Selected display indicator elements 26 and opposite element not shown could be coded with removable lens material of distinctive passive spectral responses which correlate to said red and green illumination when the display indicator is activated and are representative of the need for hot or cold fluid temperature adjustments of respective fluid control valve handles.

Figure 3:
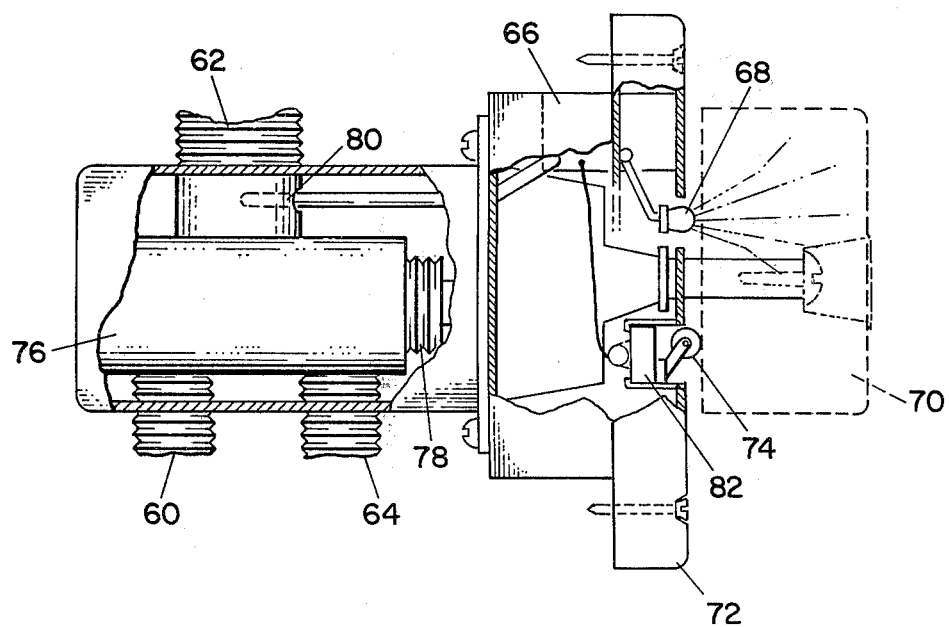
FIG. 3 is a side plan view of the preferred embodiment as used in conjunction with a typical household shower installation which contains a single fluid control valve handle.

The embodiment of the invention as envisioned would be useful in application to existing commercial or household faucet which may contain a plurality of fluid control valve handles. Further, the apparatus can be applied with little alteration to shower or bath installations to achieve and maintain predetermined fluid discharge temperatures proceeding much in the same manner as described previously for simple lavatory fixtures. The advent of modern styles in bathing equipment such as hot tubs, whirlpool baths, and spas are continued examples of applications for the apparatus of the invention. As previously described, the display indicator elements would again provide positive direction for adjustment of single or multiple fluid control valve handles to achieve a preselected fluid temperature range. FIG. 3 illustrates one such application of the apparatus of the invention as a typical single fluid control valve handle shower stall faucet.

Demonstrated by example in FIG. 3 is a wall mounted shower stall fluid control valve with adaptation to the method of the present invention. The apparatus as described contains the primary illustrated parts of; valve housing 72, rotatable fluid control valve handle 70, fluid inlet means 60 and 64 which introduce hot and cold fluids to fluid control valve 78, mixing chamber 76, and an electronic control box 66. The electronic control box 66 obtains and translates electrically sensed fluid temperatures appearing at fluid pipe 62 into directive visual indications by means of display indicator element 68 and whose operation is controlled by fluid release switch 82 and roller lever 74.

As may be seen in FIG. 3 the detail of the embodiment operates much the same as previous figures with initial rotation of fluid control valve handle 70 relieving pressure on fluid release switch 82 and roller lever 74 causing internal conductive contacts to close permitting electrical current to flow activating electronic control box 66. Once the fluid control valve handle 70 has been turned from its normally off position of no fluid discharge, inlet fluids flow into the mixing chamber 76 through fluid valve 78 as controlled by rotational direction of the fluid control valve handle. The discharged flow then passes into the fluid pipe 62 where the blend is sampled by fluid temperature resistor sensor device 80 that emulates the sensed temperature in electrical voltage equivalents that are in turn presented to electronic control box 66 for further translation into visual indications by display indicator element 68 or by a plurality of display indicator elements not shown. The activated state of these individual display indicator elements portray the need to adjust the directional rotation in example of fluid control valve handle 70 in order to achieve a balanced fluid temperature discharge of a predetermined value. Attainment of the desired fluid temperature range is so indicated when all display indicator elements have ceased to show need for further adjustment and remain in an extinguished or deactivated state.

The employment of parallel fluid release switch 82 and roller lever 74 in this application avoids previous short comings associated with direct in line fluid flow switches of other patents by placing the switch in a positive mechanical linkage with the fluid control valve handle 70. This method allows the outspout to retain residual fluids without triggering a response from the electronic control box 66 which before gave an indication even though no actual fluid discharge was in progress. Also, when fluid moisture in the exiting fluid pipe 62 was highly saturating it would cause previous in line fluid switches to detect a fluid discharge condition as well. The utilization of a parallel fluid release switch activation scheme in conjunction with a mechanical linkage allows application to a wide range of faucet devices with one or more fluid control handles as illustrated in FIG. 1 and FIG. 3 without occurance of those problems stated above. Further, additional benefits were derived by removing the fluid flow switch of previous inventions from the direct fluid path which included extending the life of the apparatus by depriving corrosion of attacking the fluid flow switch and its internal parts at an accelerated rate, when, as in previous inventions, they were exposed to constant cycling of fluids and air. The use and operation of this method as described in this embodiment provides said benefits with no preceived loss to the operator or apparatus function by indirect detection of fluid discharge.

Figure 4:
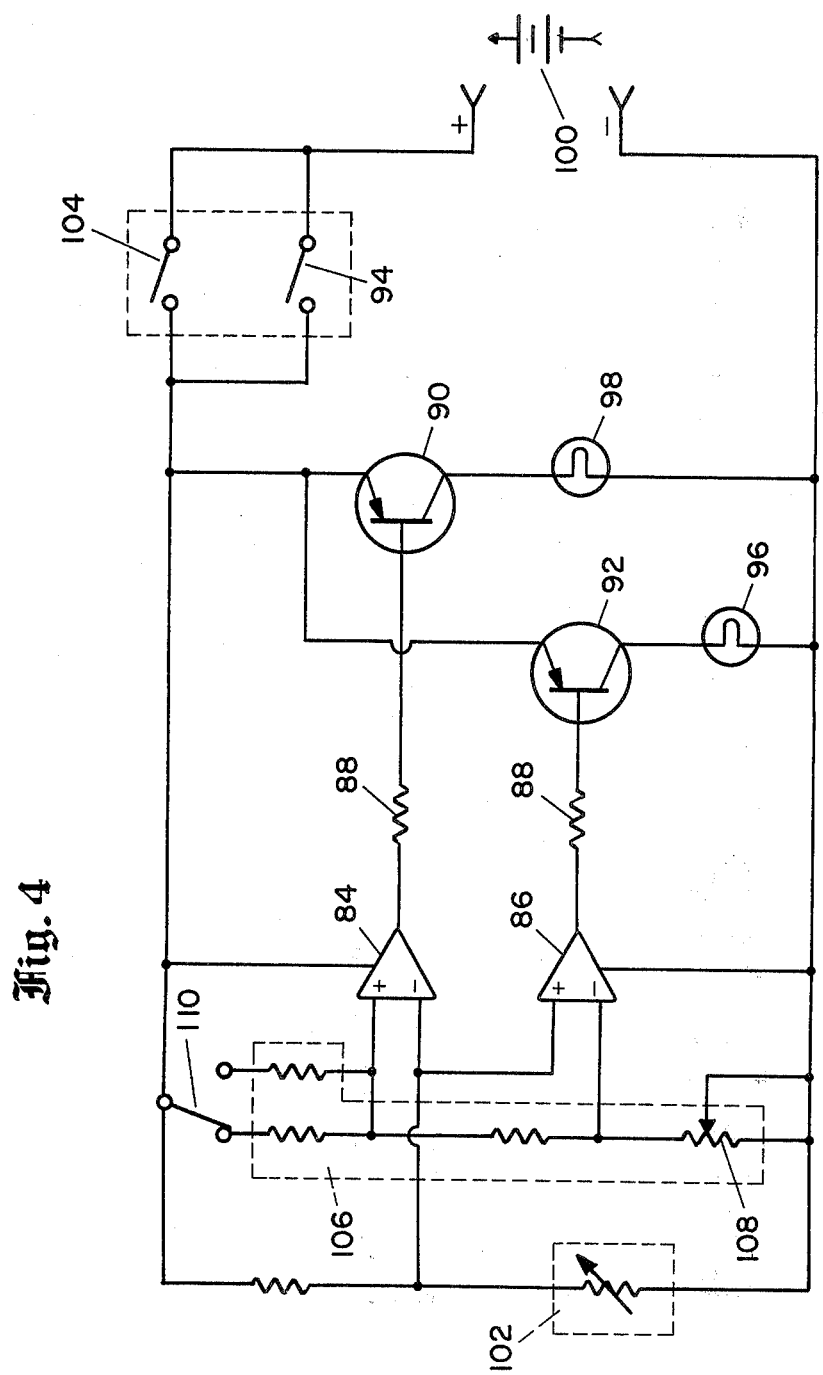
FIG. 4 shows a schematic diagram representing the signal indicating means including electrical and electronic signal converting logic, resistive fluid temperature sensor, display indicator elements, and activation switching means of the present invention.

A schematic electrical diagram is offered in FIG. 4 which illustrates the necessary electronic circuitry of the invention. Referring now to FIG. 4 upon viewing the component parts in the schematic diagram of the present invention the feature of simplicity can easily be identified over previously disclosed apparatus. The schematic represents the device of the invention in the broadest of terms consisting of the following sections; a resistive sensor device 102 for detecting fluid discharge temperature, a voltage dividing network comprised of a resistor array 106, first and second voltage comparators 84 and 86 as decision making elements, transistor switches 90 and 92 used in conjunction with display indicator elements 96 and 98 for visual indication of need for additional fluid control valve handle adjustment, a plurality of parallel fluid release switches 94 and 104 to activate the electronics of the device, and a power source 100 herein represented in its most simplistic form as a battery although other sources could be readily substituted.

A functional description of the schematic of the present invention shown in FIG. 4 reveals that initial rotation of a single fluid control valve handle selected from the plurality of fluid control valve handles causes release of previously described roller levers which raise to allow fluid release switch 94 or 104 to engage internal conductive metallic contacts. The closed conductive contacts in turn permit electrical current to flow actuating said electronic control box which contains a decision making voltage comparator circuit consisting of; a first and second voltage comparator 84 and 86, resistive sensor device 102, and display indicator elements 96 and 98. Employment of another mechanical linkage attached to the fluid control valve handle simultaneously allows fluid flow through internal valve elements into the mixing chamber and exiting to the fluid pipe. Fluid entering said fluid pipe passes resistive sensor device 102 which reacts by changing its internal electrical resistance characteristics according to the sensed fluid temperature surrounding the body of the sensor, such sensor devices are well known in the industry as thermistors, sensistors, and linear temperature sensitive semiconductors which display a high rate of resistive change for each unit of temperature deviation from 25 degrees Celsius. The resistive sensor device 102 casing is of common glass and has been demonstrated to be preferred in application because of fluid corrosion, reaction timing, cost, and exacting resistive characteristics which have a known broad uniformity and predictable nonlinearity in performance that is easily compensable by electronic means. Further, a class of semiconductor devices known widely as linear temperature sensors comprise yet another equally acceptable resistive sensing device capable of being directly employed by the circuitry described but for reasons of cost and affinity toward certain types of corrosion has been proven less desirable.

Resistive sensor device 102 is utilized electrically in the invention as a voltage divider bridging power source and return, and has a center termination point that presents a voltage value whose magnitude and polarity are directly dependent upon sensed temperature of the fluid discharge. This derived voltage value is transmitted by wire to the electronic control box circuitry whereupon it is coupled to a sense input of the first and second voltage comparators 84 and 86. Said first and second voltage comparators provide an electronic translation of sensed input to signal output based upon the magnitude of input voltage as compared against a reference source of a second voltage dividing network containing; resistor array 106, temperature range adjusting switch 110, and a range potentiometer 108. These three components yield upper and lower temperature indicating points at which display indicator elements 96 and 98 would activate, and a center band deviation or range for which no activation of display indicator elements 96 and 98 occurs. Particular selection of resistor array 106 elements values by range adjusting switch 110 or range potentiometer 108 results in operator choice of a unique and exacting fluid temperature range desired to be indicated as a result of electronic decision by first and second voltage comparators 84 and 86. The result of said decision based upon magnitude and polarity of input voltage and inherent logic characteristics of the first and second voltage comparators 84 and 86 either placing of signal of negative polarity upon the base junction of the transistor switches 90 or alternative selected transistor switch 92 by means of current limiting resistors 88, or, if the resistive sensor input is within the desired temperature range, holds both transistor switches 90 and 92 in a nonconducting state by application of a positive voltage reference that prevents continued current flow. Further, if a desired temperature range has not been achieved, transistor switches 90 and 92 conduct as the intrinsic stand off ratio of the base emitter junction has been reached by application of a known voltage differential from first and second voltage comparator which in turn allows current flow from the power source 100 to activate selected display indicator elements 96 or 98 showing the need for further fluid control valve handle adjustment.

In detailed examination of display indicator elements 96 and 98 it can easily be seen that replacement of described indicator elements with audio emitting elements of different frequency emissions would be a beneficial and simple substitution. Many such audio units are commercially available and are self contained, powered solely from activating current supplied by transistor switches 90 and 92 as were previously described indicator element types, and, further, have the ability to direct the operator toward a fluid control valve handle requiring additional manipulation by arrangement of said activated element to the handle and with an associated frequency of the audio being emitted. As before, the display indicator responds in a similar fashion but produces audio frequencies rather than light frequency emissions to direct the operator in achieving exacting control and attainment of a predetermined fluid temperature range. Having a plurality of audio display indicators each associated with its own fluid control valve handle and specific frequency of emission, a user can readily identify a low audio frequency with a cool fluid discharge and a high warning frequency with an elevated temperature fluid discharge, and be guided to further adjust a specific associated fluid control valve handle to bring about the desired discharge temperature.

Another signal indicating device that may be used, in particular for the sight and hearing impaired, is a vibrational device placed in the fluid control handles which operate in the same manner as the light emitting signals. This vibrational device can be an electromagnetic reed, for example.

The preceding description of application utilizing audio emissions and vibrational emissions from the display indicator elements to achieve a predetermined temperature discharge range demonstrates the flexibility of the apparatus of the invention to reach the broadest of use for the general public. Yet another display indicator element type can be applied with equal suitability for the operator. Again, a common display element constructed of two closely paralleled glass plates with wire electrodes implanted in a liquid crystal media at the center, forming a sandwich like material which under normal conditions is transparent to light frequencies passing through it. However, when electrical potentials are applied to the electrodes a polarization and dipole alignment of liquid crystal structure occurs within the sandwich like material causing occlusion, interference, and double refraction of light frequencies, which are reflected back toward their source of origin. Here the described liquid crystal element has been employed as display indicator elements 96 and 98 replacing other previously described types, being activated by transistor switches 90 and 92, and relaying the same directive information to the operator to guide in the corrective action process detailed in the description of the apparatus of the invention. Such elements are common to the commercial industry and are widely accepted for use as indicators in watches and electronic readouts and are found in modular units capable of placement in the area shown for other elements of the drawings and would appear externally to exhibit little overall difference. The employment of liquid crystal display indicator elements would, however, have beneficial effects in reduction of electrical power consumed by the apparatus as a whole and therefore of advantage for use where power source 100 in its most practical form would be a battery.

The total embodiment described herein represents the entire fundamentals of the present invention, alterations and improvements which are obvious to one skilled in the art no less delimit the scope or intent of the invention nor claims herein. Further, it is also obvious that other substitutions of audio, visual, or vibrational elements for display indicator elements 96 and 98 can easily be accomplished as logical extensions of this invention. However, the purpose of the embodiment, drawings and description is to place before the reader a basic structure of invention.

I claim:

1. A plumbing fixture device comprising; an apparatus of fluid valves having fluid control valve handles to control and combine fluids of varied temperatures, a valve body enclosure to include fluid inlet means and mixing chamber with a fluid outspout for emitting a blended fluid discharge, a signal indicating means as an integral part of said fixture which determines and communicates the corrective control needed to achieve a preselected fluid temperature range, said signal indicating means comprising an electronic signal converting voltage comparator circuit whose source of operating electrical current is obtained through a electrical fluid release switch that is mechanically linked to and controlled by adjustment of a fluid control valve handle, a resistive sensor device to sample fluid discharge temperature, a plurality of display indicators, said voltage comparator circuit providing a condition of signal output which is dependent upon sensed fluid discharge temperature and presence of electrical current derived by conductive contact closure of said electrical fluid release switch.

2. The device of claim 1 wherein the display indicator elements are illuminating components.

3. The device of claim 2 wherein illumination of said display indicator elements are in direct arrangement to fluid control valve handles depicting the necessity for additional and particular fluid control valve handle adjustment to achieve a desired predetermined fluid discharge temperature range.

4. The device of claim 1 comprising a single fluid control valve handle containing said indicating signal means wherein display indications of need for additional fluid control valve adjustment and the attainment of a desired predetermined fluid discharge temperature may be achieved.

5. The device of claim 2 whereby the said illuminating components issue color emissions of light showing need for a specific fluid control valve adjustment to attain a predetermined fluid temperature blend.

6. The device of claim 1 comprising range adjusting means for manual selection of separate predetermined temperature ranges.

7. The device of claim 1 comprising a range potentiometer for manual selection of the center of the indicating temperature range.

8. The device of claim 1 wherein said fluid temperature resistive sensor device comprises an electronic temperature sensitive device.

9. The device of claim 1 wherein the fluid temperature resistive sensor device is a thermistor.

10. The device of claim 1 wherein the display indicator element means is a member of the group consisting of an audio emitting element device, an illumination device, and a vibrational device.

11. The device of claim 1 wherein the display indicators are passive, reflective elements capable of altering light transmission upon application of an electrical potential.

12. A plumbing fixture device comprising; an apparatus of fluid valves having fluid control valve handles to control and combine fluids of varied temperature, a valve body enclosure to include fluid inlet means and mixing chamber with a fluid outspout for emitting a blended fluid discharge and a signal indicating means acting as an integral part of said fixture which determines and communicates the acknowledgement and corrective control needed to achieve a preselected fluid temperature range, said signal indicating means comprising, an electronic signal converting voltage comparator circuit whose source of operating electrical current is obtained through a electrical fluid release switch that is mechanically linked to and controlled by adjustment of a fluid control valve handle, a resistive sensor device to sample fluid discharge temperature, and a plurality of display indicator elements, said voltage comparator circuit providing a condition of signal output which is dependent upon sensed fluid discharge temperature and presence of said electrical current derived by conductive contact closure of said electrical fluid release switch, said voltage comparator circuit being of first and second voltage comparators, each having a separate input of opposite sensing polarity connected in common to the output of a voltage dividing fluid temperature resistive sensor device and a separator sensing input attached to a selectable resistor array acting as a voltage dividing reference source that determines both upper and lower discharge fluid temperature limits at which display indicator elements will be activated and maximum deviation from the center of a selected temperature range for which no display occurs, the output of said first and second voltage comparator circuits providing separate sources of voltage potentials to activate transistor switches and display indicator elements at fluid control valve handles in accordance with electronic voltage comparator circuit decisions based upon sensed input signal magnitude from the voltage dividing reference source resistor array and from the fluid temperature resistive sensor device, resultant electronic output action being a condition of said circuitry that both first and second voltage comparators and associated transistor switches are in a nonconducting state when a preselected fluid temperature range has been achieved, said output action further causes cessation of electrical current flow to fluid control valve handle display indicator elements portraying no further requirement for fluid control valve handle adjustments and that a desired fluid temperature has been achieved, another output action occuring when sensed fluid discharge temperatures are not within the desired range causing first or second voltage comparator, associated transistor switch, and display indicator element at the fluid control valve handle to be activated depicting need for specific additional fluid control valve handle adjustment to achieved the desired fluid temperature blend, said activation and operation of the indicating signal means and described component circuitry being dependent upon a fluid release switch consisting of electrically parallel conductive contact switching elements which close and conduct when any single fluid control valve handle is adjusted to produce a fluid discharge from the fixtures fluid outspout.

* * * * *